UNITED STATES PATENT OFFICE.

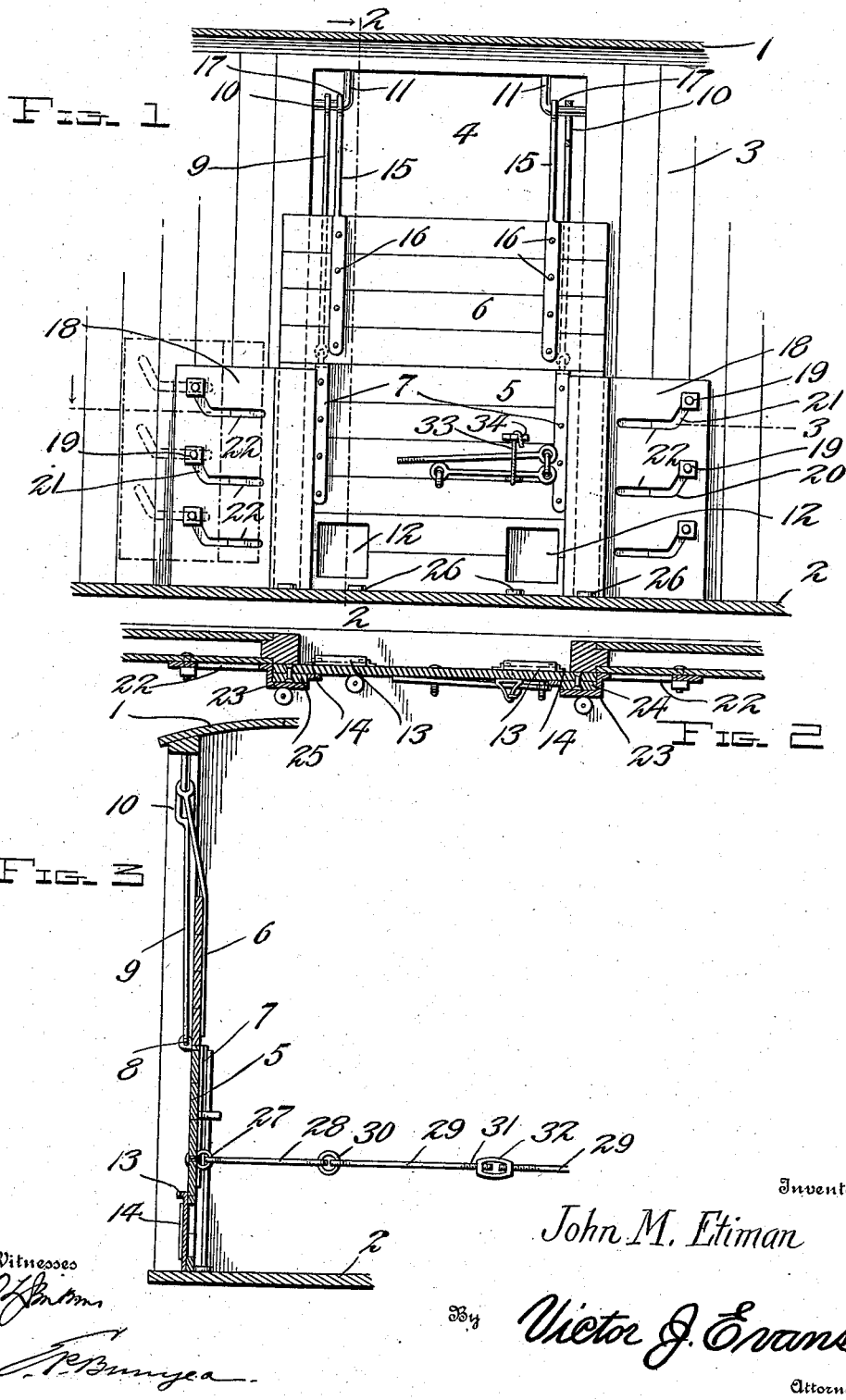

JOHN M. ETIMAN, OF MAPLETON, NORTH DAKOTA.

CAR-DOOR.

No. 899,389.  Specification of Letters Patent.  Patented Sept. 22, 1908.

Application filed May 29, 1907. Serial No. 376,379.

*To all whom it may concern:*

Be it known that I, JOHN M. ETIMAN, a citizen of the United States of America, residing at Mapleton, in the county of Cass and State of North Dakota, have invented new and useful Improvements in Car-Doors, of which the following is a specification.

This invention relates to car doors, and one of the principal objects of the same is to provide a door made in an upper and lower section which can be independently opened, and in which the upper section will form a lock to prevent the displacement of the lower section.

Another object of the invention is to provide a sectional door in which the lower section is provided with sliding brace plates for holding the door rigidly when closed.

Another object of the invention is to provide an adjustable brace rod extending from the center of one door to the center of the opposite door, said rod being made in sections and connected by a turn buckle.

These and other objects may be attained by means of the construction illustrated in the accompanying drawing, in which:

Figure 1 is a side elevation of a car door made in accordance with my invention, and looking from the inside of the car, the roof and floor of the car being shown in section. Fig. 2 is a horizontal sectional view on the line 3—3, Fig. 1, looking in the direction indicated by the arrow therein. Fig. 3 is a vertical sectional view on the line 2—2, looking in the direction indicated by the arrow in Fig. 1.

Referring to the drawing for a more particular description of my invention, the numeral 1 designates the roof of the car, 2 is the floor, and 3 the side of the car provided with a door opening 4.

The door consists of the lower section 5 and the upper section 6. The lower section has connected to it metal straps 7 at the upper ends of which said straps are bent outwardly over the upper edge of the door section 5 and provided with eyes 8. Connected to the eyes 8 are vertical supporting bars or rods 9, the upper ends of which are provided with loops 10 supported upon L-shaped brackets 11 secured to the upper and side walls of the door opening.

Formed in the door 5 near the lower side thereof are openings 12 which are closed by sliding doors 13 fitted in suitable guideways 14. The upper door section 6 has supporting rods 15 connected thereto by suitable bolts 16, and the upper ends of said rods are provided with loops 17 which are also connected to the brackets 11.

At the opposite sides of the lower door section 5 sliding plates 18 are mounted to slide upon bolts 19, said bolts being secured to the sides of the car and projecting through slots 20 provided with inclined portions 21 and horizontal portions 22. The inner edges of the sliding plates 18 are offset, as at 23, to fit the sides of the door section 5, said door section having upright brace bars 24 25. Buttons 26 are secured to the floor 2 of the car to form stops for the lower edge of the door section 5 and for the sliding plates 18. Connected centrally to the lower door section 5 is a ring 27, and a link 28 is connected to said ring. A rod 29 is connected by a ring 30 to the link 28, and said rod 29 is threaded on its ends, as at 31, for connection to a turn buckle 32 by means of which the door sections 5 upon opposite sides of the car may be braced against outward movement.

When the brace rods are disconnected from the turn buckle 32 they may be supported upon the inner side of the door section 5 by means of a rope 33 connected to a suitable loop 34 secured to the inner side of the door, as shown in Fig. 1.

From the foregoing it will be obvious that the upper section 6 of the door may be swung inwardly and connected by any suitable means to the inner wall of the roof 1 of the car, after the grain or other contents of the car has been run out through the openings 12 by sliding the doors 13 upward. After the door section 6 is swung upward and supported, the plates 18 may be slid outwardly to the position shown in dotted lines at the left of Fig. 1, and the door 5 may then be swung upwardly and supported by any suitable means to give access to the lower part or floor of the car. It is to be noted that the upper section 6 has its lower edge fitted against the upper edge of the section 5, and thus prevents the lower section from moving upward until said upper section has been swung away from the lower section.

My car door is of simple construction, is efficiently braced against strain from the inside the car, and is efficient in operation.

Having thus described the invention, what I claim is:

A car door comprising upper and lower sections, supporting bars pivotally connected at opposite ends to said door sections and to brackets at the upper side of the door opening to permit said doors to swing upwardly on said ends and inwardly therewith, laterally sliding plates provided with slots extending horizontally outwardly and inclined upwardly, and bolts passing through said slots and through the wall of the car at the opposite sides of the door to permit said plates to move laterally away from the lower section and upwardly.

In testimony whereof, I affix my signature in presence of two witnesses.

JOHN M. ETIMAN.

Witnesses:
  A. L. THOMAS,
  CHAS. B. HALL.